United States Patent [19]

Markels, Jr.

[11] Patent Number: 5,535,701
[45] Date of Patent: *Jul. 16, 1996

[54] METHOD OF INCREASING SEAFOOD PRODUCTION IN THE OCEAN

[76] Inventor: Michael Markels, Jr., 1816 Drury La., Alexandria, Va. 22307

[*] Notice: The term of this patent shall not extend beyond the expiration date of Pat. No. 5,433,173.

[21] Appl. No.: 354,876

[22] Filed: Dec. 9, 1994

Related U.S. Application Data

[63] Continuation-in-part of Ser. No. 234,374, Apr. 28, 1994, Pat. No. 5,433,173.

[51] Int. Cl.$^6$ .................................................. A01K 61/00
[52] U.S. Cl. .................................................. 119/231
[58] Field of Search .................................. 119/230, 231, 119/268, 200, 51.04, 212, 235, 242; 47/1.4 R, 1.4 AP, 1.4 SW

[56] References Cited

U.S. PATENT DOCUMENTS

| | | | |
|---|---|---|---|
| 976,793 | 11/1910 | Ellis . | |
| 2,181,882 | 12/1939 | Flower | 119/230 |
| 4,137,869 | 2/1979 | Kipping | 119/230 |
| 4,189,379 | 2/1980 | Finley . | |
| 4,235,043 | 11/1980 | Harasawa et al. | 47/1.4 R |
| 4,394,846 | 7/1983 | Roels | 119/212 |
| 4,579,579 | 4/1986 | Kerr . | |
| 4,581,846 | 4/1986 | Stensaas . | |
| 4,755,397 | 7/1988 | Eden et al. . | |
| 4,911,952 | 3/1990 | Doane et al. . | |
| 5,143,020 | 9/1992 | Patrick . | |
| 5,322,035 | 6/1994 | Hawes et al. | 119/227 |
| 5,342,525 | 8/1994 | Rowsell | 210/611 |

FOREIGN PATENT DOCUMENTS

| | | | |
|---|---|---|---|
| 467369 | 8/1950 | Canada | 119/230 |
| 1199223 | 12/1985 | U.S.S.R. | 119/230 |

OTHER PUBLICATIONS

"Testing the Iron Hypothesis in Ecosystems of the Equatorial Pacific Ocean", J. H. Martin et al., Nature, vol. 371, pp. 123–129 (Sep. 8, 1994).

Elements of Dynamic Oceanography, D. Tolmazin, 1985, pp. 22–23.

*Introduction to Microbial Biotechnology Including Hazardous Waste Treatment* by Howard E. Worne, published by The Hazardous Materials Control Resources Institute (1992). pp. 19, 46.

"Ocean Chemistry Iron Fertilization: A Tonic, but No Cure for the Greenhouse", Kerr, Richard A., Science, vol. 263, pp. 1089–1090 (Feb. 25, 1994).

*Primary Examiner*—Todd E. Manahan
*Attorney, Agent, or Firm*—Bacon & Thomas

[57] ABSTRACT

A method of increasing seafood production in the oceans comprises (1) testing the water at the surface of the ocean in order to determine the nutrients that are missing, (2) applying to the ocean water a fertilizer that comprises a microorganism that fixes nitrogen and sufficient nutrients to cause the microorganism to fix nitrogen (if the ocean water is missing nitrates), and the other missing nutrients, and (3) harvesting the increased production of seafood that results from the fertilization.

20 Claims, No Drawings

METHOD OF INCREASING SEAFOOD PRODUCTION IN THE OCEAN

This application is a continuation-in-part (CIP) of application Ser. No. 08/234,374 filed Apr. 28, 1994 now U.S. Pat. No. 5,433,173.

BACKGROUND OF THE INVENTION

The field of the invention is the production of seafood.

The earliest history of the human race shows us as hunter-gatherers, who took what the land produced for our own purposes. These hunter-gatherers were part of the natural scene rather than changing the natural scene for their own purposes. About 7,000 to 8,000 years ago in the Middle East, this changed with the domestication of wild animals, such as the cow, pig, goat, sheep and dog. At that point, our ancestors began herding domestic animals to the best pastures with changing seasons and conditions. Our ancestors continued to hunt and gather food, but found herding more productive. This trend continued with the domestication of the horse in the arid regions of Western Asia.

Then about 5,500 years ago, a new invention swept the then civilized world. This invention was the mold-board plow, which increased the productivity of a farmer by about a factor of seven. It also changed the way we looked at the land, from passive acceptance to active intervention. This change resulted in the planting of favorite crops, rather than accepting what had always grown there. Our ancestors also began to add water and nutrients to the soil, to further increase productivity.

These transitions were not always smooth or without controversy. For many years, there was a free range in the Western states of the United States of America. At that time, some argued strongly against fences, roads, houses, farms, railroads and other encroachments on the free range. They correctly argued that cities would follow such encroachments on the free range.

While such transitions have progressed considerably on the land, they have hardly begun on the oceans which cover three fourths of the earth's surface. A similar return in the increased productivity of the oceans may be achieved by similar changes.

The fishermen and the fisherwomen of the world have known for many years that there is a great variation in the productivity of the different areas of the oceans and other bodies of water. Recently, the extent of this variation has been measured and the reasons for it determined. It is now known that about 60% of all life in the ocean occurs in 2% of the ocean surface. Thus, the ocean may be considered as a vast desert with only a few verdant zones where life abounds. These verdant zones are easy to spot. For most of the ocean surface, you can see about 150 to 300 feet (about 46 to 91 meters) through the water, as you can see in the Gulf Stream. In contrast, you can see only about 2 feet (about 0.6 meters) through the water in the productive zones of the oceans because the living matter in the water is so dense. This is the case in the natural upwelling off the coast of Peru.

Samples have been taken from these productive zones, and from other areas of the ocean. The difference has been determined. The productive zones of the ocean are rich in iron, phosphorus, nitrogen and trace minerals, while the rest of the ocean is missing one or more of these elements. These fertilizing minerals are required in order to obtain the maximum production of seafood from a given area in the ocean. There is considerable variance in the nutrients present in different zones of the ocean surface, and samples must be taken and analyzed in order to ascertain the exact level of nutrients required to obtain the productivity of the Peruvian upwelling.

The oceans differ from the land in several regards: (1) there is never a drought in the oceans; (2) the oceans move; and (3) the oceans mix both vertically and horizontally. The first difference means that the oceans need only minor constituents in order to achieve improved productivity. There is also easy access to the oceans, without the need to construct railroads and highways. The second difference means that the fertilization may be carried out at a location that is quite distant from the location where the harvesting of seafood is carried out. The third difference means that the fertilization must be carried out on a large scale, or the results of the fertilization may be impossible to find.

The art that is related to the present invention includes the art of fertilizers and other methods to improve the production of seafood.

U.S. Pat. No. 4,189,379 discloses a method for bringing nutrient-rich water from the aphotic zone of the ocean to the photic zone. This patent discloses that life on earth depends on food that is created by green plant organisms through the process of conversion of sunlight into energy known as photosynthesis. In oceans, sufficient sunlight to support the process of photosynthesis is present in only the 100 to 200 meters of water beneath the surface of the ocean. The term photic zone may be used to describe this area, where all of the ocean's photosynthesis takes place. Below the photic zone, there is the aphotic zone where there is insufficient light to support photosynthesis. The production of harvestable food in the photic zone may be increased by artificially inducing an upwelling of relatively nutrient-rich water from the aphotic zone. This patent further discloses a water desalinization device that may be submerged in order to induce such an upwelling, and that avoids the disadvantages of thermally operated systems.

"Testing the iron hypothesis in ecosystems of the equatorial Pacific Ocean", J. H. Martin et al., *Nature*, Volume 371, pages 123–129 (Sep. 8, 1994) describes a test that iron might limit phytoplankton growth in large regions of the ocean by enriching an area of 64 $KM^2$ in the open equatorial Pacific Ocean with iron. This reportedly resulted in a doubling of plant biomass, a threefold increase in chlorophyll and a fourfold increase in plant production. Similar increases were reportedly found in a chlorophyll-rich plume downstream of the Galapagos Islands, which was naturally enriched in iron. These findings reportedly indicate that iron limitation can control rates of phytoplankton production and biomass in the ocean.

There are a great many fertilizers and methods of fertilization that are known to the related art.

U.S. Pat. No. 976,793 discloses a fertilizer that comprises salts such as nitrates and phosphates of ammonia and potash, with a cementitious material that produces a granular mass, from which these soluble salts will not easily be leached by the action of water.

U.S. Pat. No. 4,579,579 discloses a method for preparing a slow-release fertilizer. The fertilizer may comprise a natural, organic, highly absorbent carrier material, such as peanut hulls, with a nutrient material rich in nitrogen, phosphorous, potassium and trace elements along with a chemically complete and balanced plant nutrient. The nutrients become available at a slow and controlled rate because before they can be leached away from the peanut hulls, the organic carrier of the nutrients must decompose. In addition, the peanut hulls act not only as carrier for the nutrients but are themselves a nutrient material.

U.S. Pat. No. 4,581,846 discloses a system and method for the fertilization of forest, farm and other large plant communities. One of the objects of the invention that is disclosed by this patent, is to provide a long-term nutrient source from solid and liquid municipal wastes. The patent discloses a centralized system involving the conversion of insoluble organic and mineral compounds to soluble plant nutrients by means of microorganisms living within a cellulosic matrix of a large package.

U.S. Pat. No. 4,755,397 discloses a starch based particulate encapsulation process. This patent discloses a method for encapsulating a wide variety of materials using starch as the encapsulating agent. This process of encapsulation may be used to encapsulate a wide range of materials, including plant growth regulators and fertilizers.

U.S. Pat. No. 4,911,952 discloses encapsulation by entrapment within a matrix of unmodified starch. A substantially complete encapsulation is achieved without the use of chemical cross-linking reagents. The process may be used to encapsulate nutrients, micronutrients and a wide variety of other agents.

U.S. Pat. No. 5,143,020 discloses a pond fertilizing apparatus. This apparatus comprises a receiver that is positioned below a floatation structure. The floatation structure is provided with a funnel shaped opening. Fertilizer may be poured through the funnel shaped opening into the receiver. Water may flow between the top of the receiver and the floatation structure, and thereby dissolve fertilizer.

SUMMARY OF THE INVENTION

A method of increasing seafood production in the oceans is achieved by (1) testing the ocean water in order to determine the nutrients that are missing from the water, (2) applying to the ocean water a fertilizer that comprises a microorganism that fixes nitrogen and sufficient nutrients to cause the microorganism to fix nitrogen (if the ocean water is missing nitrates), and the other missing nutrients, and (3) harvesting the seafood that is produced by the fertilization. The testing may be carried out by any of a number of methods that are known to one of ordinary skill in the art, in order to ascertain the nutrients that are missing to a significant extent from the water. A nutrient is missing to a significant extent, if the production of seafood would be reduced to a significant extent by the level of the nutrient in the water. The fertilization may be carried out using one or more fertilizers. If the ocean water is missing nitrates, then the fertilizers should comprise nitrogen fixing microorganisms, such as blue green algae and phytoplankton (Trichodesmium) which fix nitrogen in the open ocean, and sufficient nutrients to cause the microorganisms to fix nitrogen. Preferably, the microorganisms and nutrients that are required to cause the microorganisms to fix nitrogen, are localized (such as in the same particles of fertilizer) so the nutrients are immediately available to the microorganisms when they encounter the ocean water. The careful addition of iron may be the only nutrient required to cause blue green algae and phytoplankton (Trichodesmium) to bloom and fix nitrogen. The fertilizers should provide the other (nonnitrate) nutrients that are missing from the ocean water. Thus, depending on the results of the testing, the fertilizer may comprise iron, phosphates, nitrogen fixing microorganisms, and trace minerals, as well as other materials. The fertilizer is preferably attached to a float material such as rice hulls, wheat chaff, ground corn cobs, peanut hulls and/or another ecologically suitable float material. The fertilizer may also comprise a high molecular weight starch, which allows for the timed release of the fertilizer from the float. The harvesting of the seafood may be carried out at the point of application of the fertilizer, but at a later time, or when an ocean current is involved, the harvesting may be carried out at a point downstream from the point at which the fertilizer is applied.

DETAILED DESCRIPTION OF THE INVENTION

Ocean fertilization according to the present invention would greatly increase the productivity of seafood from the oceans. (The term "oceans" also includes seas, bays and other large bodies of water). For example, ocean fertilization along the Atlantic and Pacific coasts of the United States could increase the productivity off these coasts up the level that occurs naturally off the coast of Peru. This could increase the productivity of seafood along the Atlantic and Pacific coasts of the United States by a factor of 30 or more, and thereby provide thousands of new jobs and revitalize a fishing industry that is in decline in some areas of the United States, while at the same time generating a high quality protein food for both domestic consumption and export. Ocean fertilization could also increase the fish catch off the coasts of other countries with the same benefits.

The ocean fertilization could take place within national waters, thereby assuring that the benefits of the increased production of seafood would inure to the benefit of the fishing industry of the country that engages in the ocean fertilization. For example, all of the fertilization by the United States could take place within the 200 mile (about 323 kilometer) limit, so that essentially all of the impact would be within U.S. waters.

The basic parameter of ocean fertilization is that about 1 pound (about 0.45 kilogram) of fertilizer produces about 2 to 10 tons (about 1.8 to 9.1 metric tons) of biomass in the ocean. A conservative estimate would be that a ton (about 0.9 metric ton) would produce about 4,000 tons (about 3,600 metric tons) of biomass in the ocean.

The productivity per surface area should be higher in the fertilized ocean, as compared to on the fertilized land. Sugar cane cultivation currently produces about 40 tons per acre (about 36 metric tons per 0.4 hectare) per year. If the same rate of production is achieved in ocean fertilization, this would be about 25,600 tons per square mile (about 23,300 metric tons per 2.6 square kilometers) per year.

On the land, fertilization is almost always accompanied by planting. In the ocean, the fertilization may be combined with the introduction of algae, egg masses and other organisms, including juvenile fish from hatcheries. This may further increase the production of seafood from the ocean.

On the land, the planting and fertilization are usually carried out in the spring, and the harvesting is usually carried out in the fall. In ocean farming, the amount of time between fertilization and harvesting depends on a number of factors. The delay time for algae to bloom after fertilization is about four days. Then plankton graze on the algae, the bait fish eat the plankton and on up the food chain to the large mammals and fish. Off the coasts of the United States, the most significant currents are the Gulf Stream and the Japanese current. Each of these flow at about 4 miles per hour (about 6.4 kilometers per hour). Thus, fertilization at one location of the ocean surface in either of these currents, will produce results for harvesting at another location downstream. A delay time of about four days would be about 400 miles (about 645 kilometers) at about 4 miles per hour (about 6.4 kilometers per hour). For the Gulf Stream, this means that fertilization off of Key West, Fla., would result in improved fishing off of north Florida, with the larger fish coming in off the coasts of Georgia, South Carolina, North Carolina and Virginia. The improved fishing could continue for many miles of the Gulf Stream depending on how the fertilization was carried out.

Ocean fertilization could be carried out as far north as Massachusetts in the summer when the Gulf Stream often approaches the coast. In contrast, during the winter the Labrador current brings cold water with relatively high nutrient content down as far as New York and New Jersey. Under these winter conditions, the Gulf Stream tends to veer east towards Europe outside the 200 mile (323 kilometer) limit off the coast of Virginia.

Testing may determine that ocean fertilization in the Gulf Stream may be carried out even earlier, such as off the west coast of Florida, so that the algae bloom is already underway by the time the Gulf Stream rounds Key West, Fla. This would allow more time to harvest the larger fish off the East Coast of the United States before the Gulf Stream veers east out of the national waters of the United States.

In the Gulf Stream, the fertilizer is expected to consist primarily of iron with some phosphates and some nitrogen fixing microorganisms, in order to bring the nutrient content up to the level of the Peruvian upwelling. The ocean fertilization should be monitored by testing because the Gulf Stream is complex with swirls and eddies along the coast, and there are the effects of storms, tides and occasional hurricanes. However, the result of ocean fertilization is almost certainly that algae will grow, and the rest will follow.

Ocean fertilization is effective only in the upper level of the ocean, and preferably in the top about 100 feet (about 30 meters) of the ocean. Therefore, the preferred method of ocean fertilization will hitch the fertilizer to a float, such as rice hulls, wheat chaffs, ground corn cobs, peanut hulls and so forth. The fertilizer will preferably be in the form that will dissolve in the surface water over a period of days, or perhaps as long as a week. Therefore, a preferred method of ocean fertilization will include a mixture of the fertilizer material with a high molecular weight starch, so as to produce a fertilizer that dissolves slowly in the ocean water. The initial method of ocean fertilization should be designed to bring the relevant portion of the ocean surface to the nutrient composition of the ocean surface in the Peruvian upwelling, because of the known production of seafood there. The method of ocean fertilization will preferably include additional testing and studies of the dynamics of seafood growth under the conditions of fertilization, so that further modifications and improvements in the composition of the fertilizer and the method of ocean fertilization can be achieved.

The ocean fertilization of about 53,000 square miles (about 140,000 square kilometers) at a rate of removing about 1,340 million tons (about 1,220 million metric tons) of carbon dioxide ($CO_2$) would initially require about 250,000 tons (about 230,000 metric tons) per year of fertilizer. This is about 1,000 tons (about 900 metric tons) per day for 250 days per year. If the fertilizer applied to the ocean costs about $200 per ton (about 0.9 metric ton), then the cost is about $50,000,000 per year. The cost of ocean fertilization preferably also includes the cost of monitoring, testing and reporting, so as to optimize the method of ocean fertilization, including the optimization of the composition of the fertilizer, the application rate and the location of application.

The Detailed Description above is primarily aimed at the Gulf Stream because it flows near the largest centers of population of the United States and has an existing fishing industry. However, the present method of improved production of seafood is applicable to other areas well. Modifications of the method will be required depending on the location, For example, the present method of is applicable to the West Coast of the United States as well. The Japanese current receives natural fertilization from upwellings in the Bering Sea. This enhances the production of seafood all the way down to the coast of the State of Washington, but the production of seafood dwindles along the Oregon coast and is gone by the time the Japanese current reaches northern California. The Japanese current could be fertilized off of the coast of the State of Washington in order to increase the production of seafood off the Oregon coast and California coast. Thus, the present method allows for variation, including variation in the composition of the fertilizer, as well as the location and nature of the application of fertilizer, depending on the area of the ocean that is being fertilized.

The present method of ocean fertilization could utilize ships that would be at sea for about 120 days, and have the capacity to carry about 120,000 tons (about 110,000 metric tons) of fertilizer. The ships would be provided with pumps to mix the fertilizer with the seawater, and disperses the mixture into the ocean. Each ship could be provided with 3 pumps of 2,500 horsepower each, in order to spray a mixture of 90% seawater and 10% fertilizer over the stern. Each ship would need to have a capacity of about 600,000 Bbls (about 90,000 kiloliters), which is a medium size tanker.

The fertilization of the ocean will result in an algae bloom. The algae bloom will remove $CO_2$ from the water and later from the air. The biomass will become part of the food chain eventually including large fish and whales. The animal life will oxidize the biomass and return the $CO_2$ to the ocean and eventually to the air. Some of the biological material will descend to the ocean floor where it will be picked up by the bottom currents and eventually recycled into upwellings. The total carbon that becomes part of this cycle is removed from the ocean waters and atmosphere. In time, an equilibrium will be reached just like the climax forest, after which no net reduction of atmospheric $CO_2$ will occur. The length of time for the ocean to reach this equilibrium is estimated to be many hundreds of years, but cannot be estimated with certainty. This means that a continuing ocean fertilization will remove net $CO_2$ for a substantial period of time to come.

The production of 1,000 million tons (about 900 million metric tons) of algae (biomass) per year would produce about 50,000,000 tons (about 45,000,000 metric tons) of additional fish, if we get about 1 ton (about 1.1 metric ton) of useful fish for each 20 tons (about 18 metric tons) of algae. This is about 1 pound (about 0.45 kilogram) of additional fish per day for every man, woman and child in the United States, that would be achieved by using the present method of improved production of seafood in the Gulf Stream as discussed above. Thus, a highly nutritious source of food would be produced for both residents of the United States and other countries by using the present method of improved production of seafood in the Gulf Stream.

The fertilizer to be used in the present method of production of seafood will have a number of specifications, such as the rate of dissolution and a density less than water, as well as the required nutrient value and content of nitrogen fixing microorganisms. The least expensive source of raw materials that have the required chemical composition should suffice, because sea life seems able to process fertilizer regardless of the form or chemical combination. The fertilizer must not contain any toxic chemicals in a concentration that would harm the sea life, and must be free of pathogens that could be ingested by the consumers of the seafood. Thus, there are many waste streams that could be processed to produce a suitable fertilizer at a low cost, and at a significant addition to the effort to recycle waste.

The present method of improved production of seafood would have significant economic impact. The production of 50,000,000 tons (about 45,000,000 metric tons) per year of additional seafood along one coast of the United States would produce a $50,000,000,000 per year industry if the value of the seafood averages 0.50 per pound (0.45 kilograms). This would create one million new jobs for each coast, if there was one new job for each $50,000 in sales per year.

Variations of the invention may be envisioned by those skilled in the art and the invention is to be limited solely by the claims appended hereto.

I claim:

1. A method of increasing seafood production in the ocean comprising the following steps:
   (1) testing an area of the surface of the ocean, in order to determine at least one of the nutrients that is missing to a significant extent; and
   (2) applying a fertilizer to fertilize the surface of the ocean, said fertilizer comprising a float material, at least one microorganism that fixes nitrogen and at least one member selected from the group consisting of said nutrients; and
   (3) harvesting at least a portion of the increased production of seafood that results from said fertilization of said ocean.

2. The method of claim 1, wherein said at least one microorganism comprises at least one member selected from the group consisting of blue green algae and phytoplankton, and said fertilizer comprises sufficient localized nutrients to cause at least one of said microorganisms to fix nitrogen.

3. The method of claim 2, wherein said fertilizer comprises iron and a high molecular weight starch.

4. The method of claim 1, wherein said fertilizer comprises a phosphate.

5. The method of claim 1, wherein said fertilizer comprises iron, and said fertilizer dissolves slowly in the ocean.

6. The method of claim 1, wherein said fertilizer comprises trace minerals.

7. The method of claim 1, wherein said float material is selected from rice hulls, wheat chaff, ground corn cobs, peanut hulls and other ecologically suitable float materials.

8. The method of claim 1, wherein said fertilizer further comprises a high molecular weight starch.

9. The method of claim 1, wherein said applying a fertilizer is combined with the introduction of an organism selected from algae, egg masses and juvenile fish.

10. A method of ocean fertilization comprising the following step: applying a fertilizer to fertilize the surface of the ocean, said fertilizer comprising a float material and at least one microorganism that fixes nitrogen.

11. The method of claim 10, wherein said at least one microorganism comprises at least one member selected from the group consisting of blue green algae and phytoplankton, and said fertilizer comprises sufficient localized nutrients to cause at least one of said microorganisms to fix nitrogen.

12. The method of claim 11, wherein said fertilizer comprises iron and said fertilizer dissolves slowly in the ocean.

13. The method of claim 11, wherein said fertilizer comprises iron and a high molecular weight starch.

14. The method of claim 11, wherein said applying a fertilizer is combined with the introduction of an organism selected from algae, egg masses and juvenile fish.

15. The method of claim 10, wherein said fertilizer comprises trace minerals.

16. The method of claim 10, wherein said fertilizer comprises a phosphate.

17. The method of claim 10, wherein said float material is selected from rice hulls, wheat chaff, ground corn cobs, peanut hulls and other ecologically suitable float materials.

18. The method of claim 10, wherein said fertilizer further comprises a high molecular weight starch.

19. The method of claim 10, wherein said fertilizer comprises iron, and said fertilizer dissolves slowly in the ocean.

20. The method of claim 10, wherein said applying a fertilizer is combined with the introduction of an organism selected from algae, egg masses and juvenile fish.

* * * * *